US012689936B2

(12) United States Patent
Liu

(10) Patent No.: US 12,689,936 B2
(45) Date of Patent: Jul. 21, 2026

(54) METHOD FOR INITIATING SERVICE, COMMUNICATION DEVICE, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 361 days.

(21) Appl. No.: 18/039,159

(22) PCT Filed: Nov. 30, 2020

(86) PCT No.: PCT/CN2020/132922
§ 371 (c)(1),
(2) Date: May 26, 2023

(87) PCT Pub. No.: WO2022/110207
PCT Pub. Date: Jun. 2, 2022

(65) Prior Publication Data
US 2023/0422083 A1 Dec. 28, 2023

(51) Int. Cl.
H04W 28/02 (2009.01)

(52) U.S. Cl.
CPC ............................... H04W 28/0268 (2013.01)

(58) Field of Classification Search
CPC .......................... H04W 28/0268; H04W 76/00
See application file for complete search history.

(56) References Cited

U.S. PATENT DOCUMENTS

| | | | |
|---|---|---|---|
| 11,083,026 B2 * | 8/2021 | Lauridsen | H04W 76/10 |
| 2019/0230681 A1 * | 7/2019 | Han | H04W 72/542 |
| 2020/0245113 A1 * | 7/2020 | Kang | H04W 76/27 |

FOREIGN PATENT DOCUMENTS

| | | | |
|---|---|---|---|
| CN | 107889255 A | 4/2018 | |
| CN | 111294224 A | 6/2020 | |
| WO | WO-2020064555 A1 * | 4/2020 | H04W 4/46 |

OTHER PUBLICATIONS

Chinese Patent Application No. 202080003797.4, Office Action dated Jul. 13, 2023; 5 pages.
Chinese Patent Application No. 202080003797.4, English translation of Office Action dated Jul. 13, 2023, 10 pages.

* cited by examiner

*Primary Examiner* — Zhensheng Zhang
(74) *Attorney, Agent, or Firm* — Cozen O'Connor

(57) ABSTRACT

A method for initiating a service, performed by a terminal, includes: determining an operation initiated for a service based on a determination result of Quality of Service (QoS) provided by a network side and QoS required for the service.

14 Claims, 6 Drawing Sheets

METHOD FOR INITIATING SERVICE, COMMUNICATION DEVICE, AND STORAGE MEDIUM

CROSS-REFERENCE TO RELATED APPLICATION

This application is a U.S. national phase of International Application No. PCT/CN2020/132922, filed on Nov. 30, 2020, the entire content of which is incorporated herein by reference.

TECHNICAL FIELD

The disclosure relates to the field of communication technology including wireless communication technology, in particular to a method for initiating a service, a communication device and a storage medium.

BACKGROUND

The 3rd Generation Partnership Project (3GPP) has proposed satellite communication as an access technology for the 5th Generation (5G) mobile communication networks. This involves using communication with a satellite as a transmission link between the access network and the core network. However, the transmission delay of the network when communication with satellites may increase significantly. At this time, wireless communication networks are unable to support services with high requirements for latency.

SUMMARY

According to a first aspect of the embodiments of the disclosure, a method for initiating a service, performed by a terminal, is provided. The method includes:

determining an operation initiated for a service based on a determination result of Quality of Service (QoS) provided by a network side and QoS required for the service.

According to a second aspect of the embodiments of the disclosure, a method for initiating a service, performed by a network side, is provided. The method includes:

sending QoS provided by the network side to a terminal; in which the QoS provided by the network side is provided for the terminal to determine, based on a determination result of the QoS provided by the network side and QoS required for the service, an operation initiated for the service.

According to a third aspect of the embodiments of the disclosure, a communication device is provided. The communication device includes:

a processor;

a memory for storing instructions executable by the processor; in which the processor is configured to, when the instructions are executed, implement the method described in any embodiment of the disclosure.

According to a fourth aspect of the embodiments of the disclosure, a computer storage medium having computer-executable programs stored thereon. When the computer-executable programs are executed by a processor, the method according to any embodiment of the disclosure is implemented.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terms used in the embodiments of the disclosure are intended to describe specific embodiments only, and are not intended to limit the embodiments of the disclosure. The singular forms of "a" and "the" as used in the embodiments of the disclosure and the appended claims are also intended to include the plural forms, unless clearly indicated in the context otherwise. It should also be understood that the term "and/or" as used herein refers to and includes any or all possible combinations of one or more of associated listed items.

It should be understood that while the terms "first", "second", "third", etc. may be employed in the embodiments of the disclosure to describe various kinds of information, such information should not be limited to these terms. These terms are used only to distinguish the same type of information from each other. For example, without departing from the scope of the embodiments of the disclosure, first information may also be referred to as second information, and similarly, second information may also be referred to as first information. Depending on the context, for example, the term "if" as used herein may be interpreted as "while . . . ", "when . . . ", or "in response to determining . . . ".

For the purpose of simplicity and ease of understanding, the term "greater than" or "less than" is used in this disclosure to represent the size relation. However, for those skilled in the art, it can be understood that the term "greater than" also covers the meaning of "greater than or equal to", and "less than" also covers the meaning of "less than or equal to".

Figure 1:
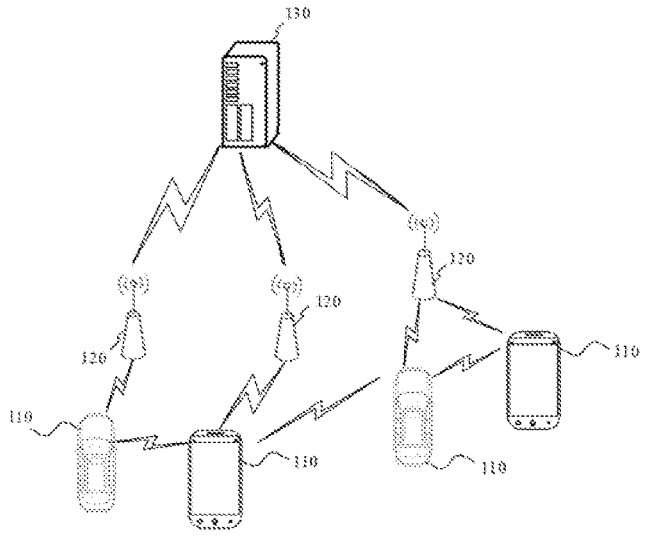
FIG. 1 is a schematic diagram of a wireless communication system.

FIG. 1 is a schematic diagram of a wireless communication system according to an embodiment of the disclosure. As shown in FIG. 1, the wireless communication system is a communication system based on cellular mobile communication technology. The wireless communication system may include: a plurality of user devices 110 and a plurality of base stations 120.

The user device 110 may be a device that provides voice and/or data connectivity to a user. The user device 110 may communicate with one or more core networks via a Radio Access Network (RAN). The user device 110 may be an Internet of Things (IoT) user device, such as a sensor device, a cell phone (or "cellular" phone), and a computer with an IoT user device. The user device 110 may also be a stationary, portable, pocket-sized, handheld, computer-built, or vehicle-mounted device, such as, a Station (STA), a subscriber unit, a subscriber station, a mobile station, a mobile, a remote station, an access point, a remote terminal, an access terminal, a user terminal, a user agent, a user device, or a user equipment. Alternatively, the user device 110 may be an unmanned aerial vehicle device. Alternatively, the user device 110 may be an in-vehicle device, for example, an Electronic Control Unit (ECU) having wireless communication function, or a wireless user device connected to an external ECU. Alternatively, the user device 110 can also be a roadside device, for example, a street light, a signal light, or other roadside devices having wireless communication function.

The base station 120 may be a network side device in a wireless communication system. The wireless communication system may be the 4th Generation (4G) mobile communication system, also known as Long Term Evolution (LTE) system. Alternatively, the wireless communication system may also be a 5G system, also known as New Radio (NR) system or 5G NR system. Alternatively, the wireless communication system may be a next-generation system of the 5G system. An access network in the 5G system may be called New Generation-Radio Access Network (NG-RAN).

The base station 120 can be an evolved base station (eNB) employed in the 4G system. Alternatively, the base station 120 may be a base station (gNB) adopting a centralized distributed architecture in the 5G system. When the base station 120 adopts the centralized distributed architecture, it usually includes a Central Unit (CU) and at least two Distributed Units (DUs). The centralized unit is equipped with protocol stacks of a Packet Data Convergence Protocol (PDCP) layer, Radio Link Control (RLC) layer, and a Media Access Control (MAC) layer. The DU is equipped with a protocol stack of a physical (PHY) layer, and the specific implementation of the base station 120 is not limited in this disclosure.

A wireless connection can be established between the base station 120 and the user device 110 via a wireless radio. In different implementations, the wireless radio is a wireless radio based on the 4G standard. Alternatively, the wireless radio is a wireless radio based on the 5G standard, such as a NR. Alternatively, the wireless radio may also be a wireless radio based on the next generation mobile communication network technology standard of the 5G standard.

In some embodiments, E2E (End to End) connections can also be established between the user devices 110, such as scenarios of Vehicle to Vehicle (V2V) communication, Vehicle to Infrastructure (V2I) communication, and Vehicle to Pedestrian (V2P) communication in Vehicle to Everything (V2X) communication.

The above user device can be considered as the terminal device of the following embodiments.

In some embodiments, the above wireless communication system may also include a network management device 130.

The plurality of base stations 120 are connected to the network management device 130 respectively. The network management device 130 may be a core network device in a wireless communication system. For example, the network management device 130 may be a Mobility Management Entity (MME) in an Evolved Packet Core (EPC) network. Alternatively, the network management device may be another core network devices, such as a Serving Gate Way (SGW), a Public Data Network Gate Way (PGW), Policy and a Charging Rules Function (PCRF), or a Home Subscriber Server (HSS), etc. The implementation form of the network management device 130 is not limited in the embodiments of the disclosure.

To facilitate the understanding of the embodiments of the disclosure, a method for initiating a service is illustrated by the following example.

When a terminal is to initiate a service, the terminal initiates a service request to the network, and the network evaluates Quality of Service (QoS) required for the service. If the network cannot satisfy the QoS required for the service, the network rejects the service. In this method for initiating a service, the terminal initiates the service request to the network regardless of whether QoS provided by the network satisfies the QoS required for initiating the service. Since there is no need to initiate the service request when the QoS provided by the network does not satisfy the QoS required for initiating the service, the system overhead is very large, and the system resources may be wasted.

Figure 2:
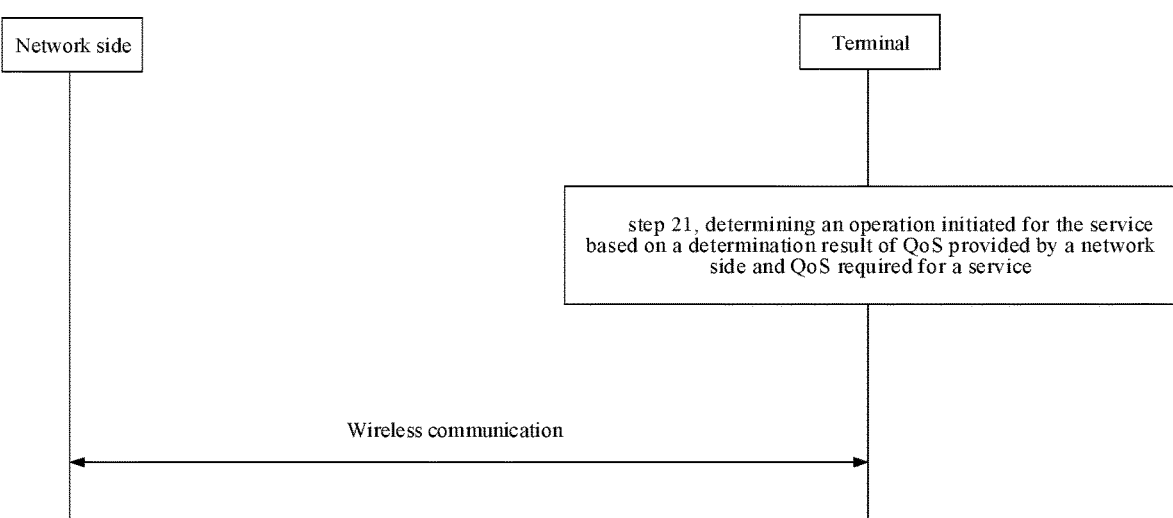
FIG. 2 is a flow chart of a process for initiating a service, performed by a terminal, according to an embodiment.

As shown in FIG. 2, a method for initiating a service, performed by a terminal, is provided in this embodiment. The method includes the following steps.

At step 21, an operation initiated for the service is determined based on a determination result of QoS provided by a network side and QoS required for a service.

In some embodiments, the terminal may be, but is not limited to, a cell phone, a wearable device, a vehicle terminal, a Road Side Unit (RSU), a smart home terminal, an industrial sensing device, and/or a medical device.

In an embodiment, the network side includes:
an access network;
a transmission network, the transmission network including: a satellite network; and
a core network, the transmission network being connected between the access network and the core network.

The access network at least includes: an access device that can be accessed by the terminal, such as a base station.

The transmission network is connected with the access network and the core network, and is used for data interaction between the access network and the core network.

The core network is a network that is far away from the terminal and provides data transmission for the terminal. The core network includes various core network elements, such as Network Exposure Function (NEF), Access and Mobility Management Function (AMF), and Session Management Function (SMF). Certainly, these are only examples of network elements of the core network.

The satellite network can be a network that uses satellites for data transmission. A communication link of the satellite network is a transmission link between the access network and the core network.

In an embodiment, the terminal may access the network through a base station in the access network. The network may be a Non-Terrestrial Network (NTN).

In some embodiments, the base station may be of various types, such as, a base station for the 3G mobile communication network, a base station for the 4G mobile communication network, a base station for the 5G mobile communication network, or other eNBs.

In some embodiments, the base station may be set up on a high altitude platform or on a satellite.

In an embodiment, the QoS may include a plurality of QoS parameters.

In an embodiment, the QoS parameters include at least one of the following parameters: data transmission delay, a data packet loss rate, and a bandwidth for data transmission.

In an embodiment, the QoS is determined based on the plurality of QoS parameters.

In an embodiment, each service is configured with a corresponding QoS, and the QoS includes different QoS parameter requirements. The QoS parameter requirement is used to indicate a QoS parameter of the QoS required to initiate the service.

In an embodiment, the QoS parameter requirement includes a requirement for at least one of the following parameters: data transmission delay, a data packet loss rate, and/or a bandwidth for data transmission. The QoS parameter requirement may be a threshold range of one or more kinds of the above parameters. For example, the data transmission delay is greater than A and less than B and/or the data packet loss rate is greater than C and less than D.

In an embodiment, when the QoS provided by the network side can satisfy the QoS configured for the service, the service can be initiated, so as to ensure the QoS of the initiated service and reduce a probability of service initiation failure.

In an embodiment, when all the QoS parameters provided by the network side satisfy the QoS parameter requirements, the QoS provided by the network side satisfies the QoS configured for the service. When at least one QoS parameter in the multiple QoS parameters provided by the network side does not satisfy the QoS parameter requirements, the QoS provided by the network side does not satisfy the QoS configured for the service.

In an embodiment, the QoS required for initiating different services may be different.

In an embodiment, information of a QoS parameter requirement corresponding to each service can be stored in a storage area of the terminal in advance. When a service is to be initiated, the terminal may obtain the information of the QoS parameter requirement corresponding to the service from the storage area according to a service type of the service to be initiated, and can determine the QoS required for initiating the service according to the information of the QoS parameter requirement. The information of the QoS parameter requirement may be threshold range information of the QoS parameter.

In an embodiment, when the terminal is to initiate a service, QoS parameter requirement information input for the service is detected on a human-machine interaction interface, and the terminal determines the QoS required for initiating the service based on the QoS parameter requirement information input. The QoS parameter requirement information may be threshold range information of the QoS parameter.

In an embodiment, when the terminal is to initiate a service, QoS configured for the service may be determined based on QoS parameter requirements used by the terminal to initiate the service during a historical time period. In this way, there is no need to reconfigure the QoS parameter requirements for the terminal. Initiating the service during the historical time period can be initiating the service in a pre-defined time period in the past.

In an embodiment, initiating the service during the historical time period can be initiating the service during the historical time period in a network that contains a satellite network or initiating the service during the historical time period in a network that does not contain a satellite network.

In an embodiment, if a delay requirement for initiating a service in a network that does not contain a satellite network is "a" seconds during the historical time period, a delay requirement for initiating the service in a network that contains a satellite network this time is also "a" seconds.

In an embodiment, the QoS that the network is capable to provide is determined based on a transmission network type used to initiate the current service. For example, when the transmission network type used to initiate the current service is a first transmission network type, the QoS provided by the network is determined to be a first QoS. When the transmission network type used to initiate the current service is a second transmission network type, the QoS provided by the network is determined to be a second QoS. A network of the first transmission network type is a network whose transmission network contains a satellite network. A network of the second transmission network type is a network whose transmission network does not contain a satellite network. The first QoS is different from the second QoS. It may be that a QoS parameter value contained in the first QoS is different from a QoS parameter value contained in the second QoS. For example, if the QoS parameter is the transmission delay, the transmission delay included in the first QoS is greater than the delay included in the second QoS. In this way, the QoS provided by the network side can be adjusted in time to adapt to the transmission network type used to initiate the current service.

In an embodiment, the QoS provided by the network side can be different at different time periods.

In an embodiment, when a channel transmission quality of channel transmission on the network side is greater than a channel transmission quality threshold, the QoS provided by the network side is greater than the QoS threshold. When the channel transmission quality of channel transmission on the network side is less than the channel transmission quality threshold, the QoS provided by the network side is less than the QoS threshold. In this way, the QoS provided by the network side can be adjusted in time to adapt to the channel transmission quality.

In an embodiment, when the number of services connected to the network side is greater than a quantity threshold, the QoS provided by the network side is less than the QoS threshold. When the number of services connected to the network side is less than the quantity threshold, the QoS provided by the network side is greater than the QoS threshold. In this way, the QoS provided by the network side can be adjusted in time to adapt to the number of services connected to the network side.

In an embodiment, when the transmission network on the network side contains a satellite network, the QoS provided by the network side is less than the QoS threshold. When the transmission network on the network side does not contain a satellite network, the QoS provided by the network side is greater than the QoS threshold.

In an embodiment, the network side periodically sends the QoS provided by the network side to the terminal.

In an embodiment, a sending period for the network side to send the QoS provided by the network side to the terminal can be determined according to a frequency at which the terminal initiates services.

In an embodiment, when the frequency at which the terminal initiates services is greater than a frequency threshold, the sending period for sending the QoS provided by the network side can be configured to be less than a period threshold. When the frequency at which the terminal initiates services is less than the frequency threshold, the sending period for sending the QoS provided by the network side can be configured to be greater than the period threshold. In this way, the sending period for sending the QoS provided by the network side can be adjusted adaptively according to the frequency at which the terminal initiates services, thereby saving system resources.

In an embodiment, when the terminal has a demand to initiate a service, the operation initiated for the service is determined based on the determination result of the QoS provided by the network side and the QoS required for the service determined by the terminal.

In an embodiment, in response to an application of the service being initiated, it is determined that the terminal has a demand to initiate the service.

In an embodiment, in response to establishing a Radio Resource Control (RRC) connection between the terminal and the base station, it is determined that the terminal has a demand to initiate the service.

In an embodiment, the determination result of the QoS provided by the network side and the QoS required for the service determined by the terminal includes: the QoS provided by the network side satisfying the QoS required by the terminal to initiate the service, or the QoS provided by the network side not satisfying the QoS required by the terminal to initiate the service.

In an embodiment, the terminal may compare a value of the QoS provided by the network side with a value of the QoS required for the service, to obtain the determination result.

In an embodiment, the value of the QoS may be a weighted sum of QoS parameters determined based on preset weights. For example, the QoS may include QoS parameters. The QoS parameters are transmission delay x and data packet loss rate y, and a preset weight coefficient for the transmission delay is a, and a preset weight coefficient for the data packet loss rate is b, and then the value of the QoS is z, and z=(ax+by).

In an embodiment, when the value of QoS provided by the network side is greater than the value of QoS required for the service, it is determined that the QoS provided by the network side satisfies the QoS required by the terminal to initiate the service. When the value of the QoS provided by the network side is less than the value of the QoS required for the service, it is determined that the QoS provided by the network side does not satisfy the QoS required by the terminal to initiate the service.

In an embodiment, the QoS parameters of the QoS required for initiating the service are indicated by a QoS parameter threshold range. The terminal may compare the QoS parameters included in the QoS provided by the network side with corresponding QoS parameter thresholds included in the QoS required for the service respectively, to obtain the comparison result.

In an embodiment, when each QoS parameter included in the QoS provided by the network side is within the corresponding QoS parameter threshold range included in the QoS required for the service, it is determined that the QoS provided by the network side satisfies the QoS required for the terminal to initiate the service. When at least one QoS parameter included in the QoS provided by the network side is not within the corresponding QoS parameter threshold range included in the QoS required for the service, it is determined that the QoS provided by the network side does not satisfy the QoS required for the terminal to initiate the service.

In an embodiment, when the QoS provided by the network side satisfies the QoS required by the terminal to initiate the service, it is determined that the service can be initiated. When the QoS provided by the network side does not satisfy the QoS required for the terminal to initiate the service, it is determined that the service is not initiated.

In the embodiment of the disclosure, the terminal can determine whether the QoS provided by the network side is able to satisfy the QoS required for the service based on the QoS provided by the network side and the QoS required for the service, and determine the operation initiated for the service based on the determination result. Compared with the way that the terminal initiates the service regardless of whether the QoS provided by the network side can satisfy the QoS required for the service, the above method can reduce the unnecessary system overhead caused when the terminal initiates the service under a condition that the QoS provided by the network side cannot satisfy the QoS required for the service, thereby saving system resources. On the other hand, in the embodiment of the disclosure, the terminal rather than the network side is used to determine whether the QoS provided by the network side satisfies the QoS required for the service. In this way, the determination process is performed by the terminal, which reduces the interaction between the terminal and the network side, and reduces the processing delay of the service initiation.

Figure 3:
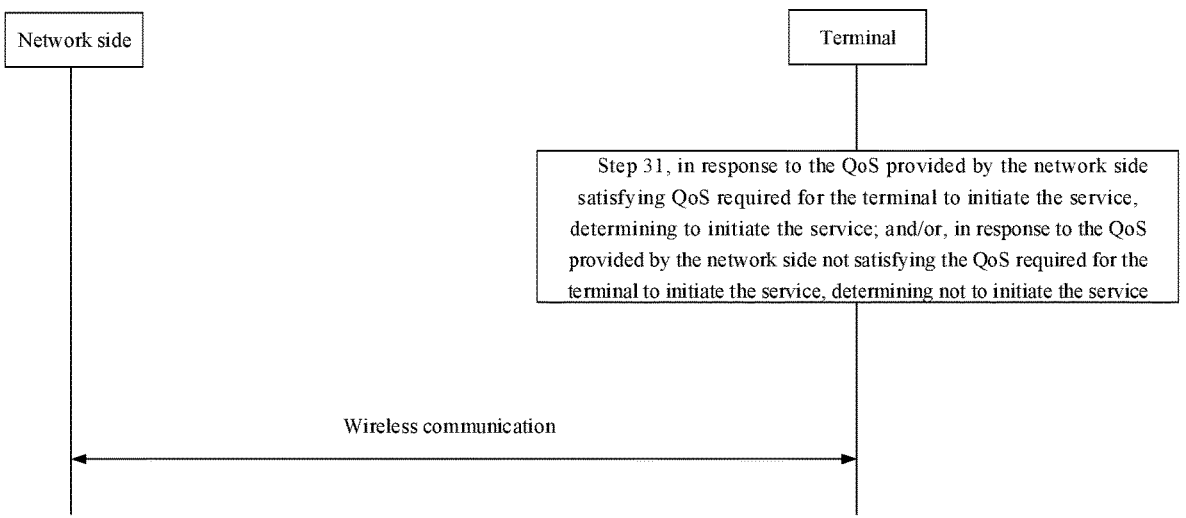
FIG. 3 is a flow chart of a process for initiating a service according to an embodiment.

As shown in FIG. 3, a method for initiating a service is provided in this embodiment. The step 21 of determining the operation initiated for the service based on the determination result of the QoS provided by the network side and the QoS required for the service includes the following.

At step 31, in response to the QoS provided by the network side satisfying QoS required for the terminal to initiate the service, it is determined to initiate the service;
 and/or,
   in response to the QoS provided by the network side not satisfying the QoS required for the terminal to initiate the service, it is determined not to initiate the service.

In an embodiment, each service is configured with a corresponding QoS, and the QoS includes different QoS parameter requirements. The QoS parameter requirement is used to indicate a QoS parameter of the QoS required to initiate the service.

In an embodiment, the QoS parameter requirement includes a requirement for at least one of the following parameters: data transmission delay, a data packet loss rate, and/or a bandwidth for data transmission. The QoS parameter requirement may be a threshold range of one or more kinds of the above parameters.

In an embodiment, the terminal may compare a value of the QoS provided by the network side with a value of the QoS required by the service and obtains the determination result.

In an embodiment, the value of the QoS may be a weighted sum of the QoS parameters determined based on preset weights. For example, the QoS may include QoS parameters it is determined transmission delay x and data packet loss rate y, and a preset weight coefficient for the transmission delay is a, and a preset weight coefficient for the data packet loss rate is b, the value of the QoS is z and z=(ax+by).

In an embodiment, when the value of the QoS provided by the network side is greater than the value of QoS required for the service, it is determined that the QoS provided by the network side satisfies the QoS required for the terminal to initiate the service. When the value of the QoS provided by the network side is less than the value of the QoS required for the service, it is determined that the QoS provided by the network side does not satisfy the QoS required for the terminal to initiate the service.

In an embodiment, the QoS parameters for the QoS required for initiating the service are indicated by a QoS parameter threshold range. The terminal may compare the QoS parameters included in the QoS provided by the network side with corresponding QoS parameter thresholds included in the QoS required for the service respectively, to obtain the comparison result.

In an embodiment, when each QoS parameter included in the QoS provided by the network side is within the corresponding QoS parameter threshold range included in the QoS required for the service, it is determined that the QoS provided by the network side satisfies the QoS required by the terminal to initiate the service. When at least one QoS parameter included in the QoS provided by the network side is not within the corresponding QoS parameter threshold range included in the QoS required for the service, it is determined that the QoS provided by the network side does not satisfy the QoS required by the terminal to initiate the service.

In an embodiment, when the QoS provided by the network side satisfies the QoS required by the terminal to initiate the service, it is determined that the service is initiated. When the QoS provided by the network side does not satisfy the QoS required for the terminal to initiate the service, it is determined that the service is not initiated.

In an embodiment, initiating the service includes: sending a service request to the network side.

Figure 4:
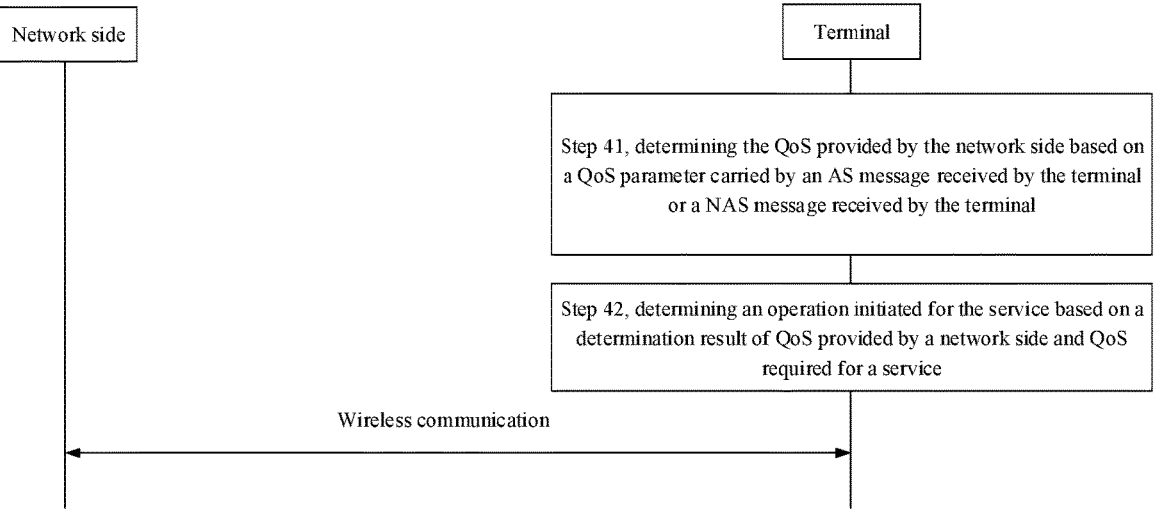
FIG. 4 is a flow chart of a process for initiating a service according to an embodiment.

As shown in FIG. 4, a method for initiating a service is provided in this embodiment. The method further includes the following steps.

At step 41, the QoS provided by the network side is determined based on a QoS parameter carried by an Access Stratum (AS) message received by the terminal or a Non Access Stratum (NAS) message received by the terminal.

In an embodiment, the NAS message includes: messages of two sub-layers: a Connection Management (CM) sub-layer and a Mobility Management (MM) sub-layer.

In an embodiment, the AS message includes: messages of a Radio Resource Control (RRC) layer, a Radio Link Control (RLC) layer and a Media Access Control (MAC) layer.

In an embodiment, the QoS parameter includes at least one of the followings: data transmission delay, a data packet loss rate, and a bandwidth for data transmission.

In an embodiment, the AS message and the NAS message carry one or more kinds of QoS parameters.

In an embodiment, the AS message and the NAS message may carry a threshold of one or more kinds of the above parameters. For example, the AS message carries information that the data transmission delay is greater than A and less than B.

In an embodiment, the carried QoS parameter may be a parameter indicated by a threshold range of the QoS parameter.

Figure 5:
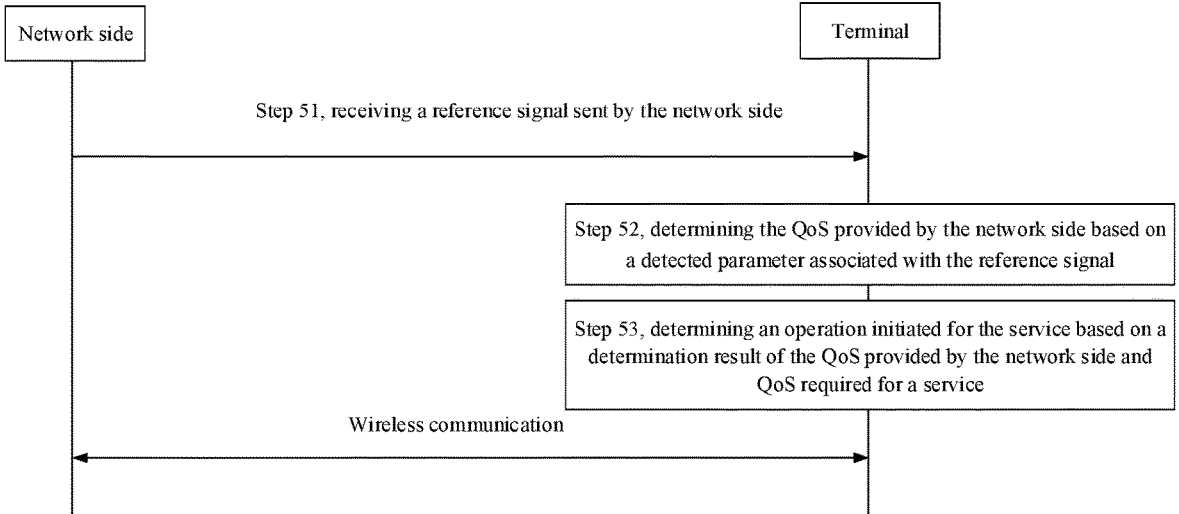
FIG. 5 is a flow chart of a process for initiating a service according to an embodiment.

As shown in FIG. 5, a method for initiating a service is provided in this embodiment. The method further includes the following steps.

At step 51, a reference signal sent by the network side is received.

At step 52, the QoS provided by the network side is determined based on a detected parameter associated with the reference signal.

In an embodiment, the reference signal sent by the network side can be at least one of the followings: a User-Specific Reference Signal (DM-RS), a Channel-State Information-Reference Signal (CSI-RS) and a Cell-Specific Reference Signal (CRS).

In an embodiment, the parameter associated with the reference signal includes at least one of the followings: transmission delay of the reference signal and signal-receiving strength of the reference signal.

In an embodiment, the parameter associated with the reference signal is an average value of parameters associated with the reference signal sent by the network side that is received during a preset time period.

In an embodiment of the disclosure, the network side does not need to send and provide QoS to the terminal, and the terminal can determine the QoS provided by the network side by detecting the parameter associated with the reference signal, thereby saving the transmission resources of the system.

Figure 6:
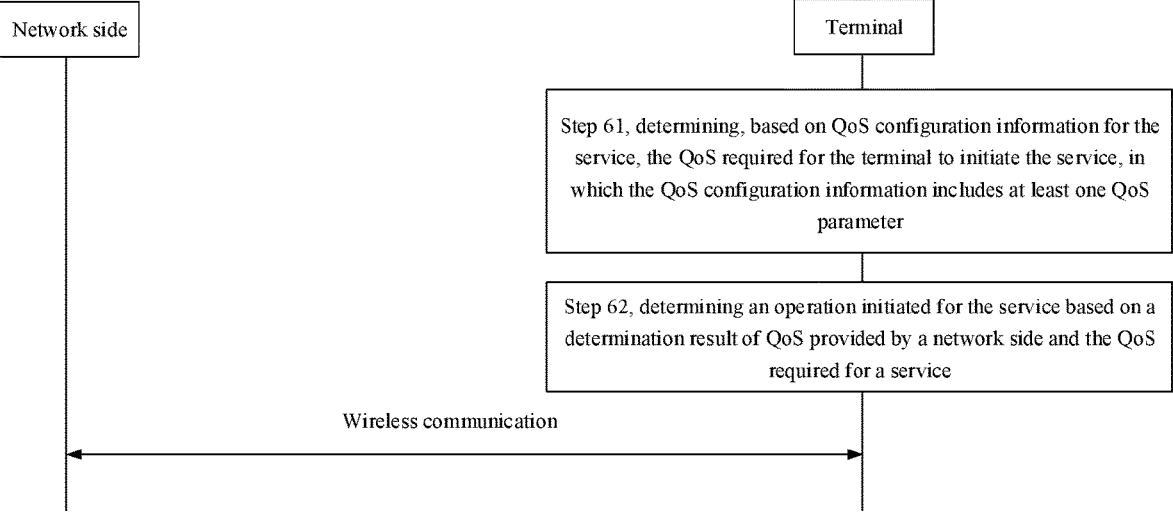
FIG. 6 is a flow chart of a process for initiating a service according to an embodiment.

As shown in FIG. 6, a method for initiating a service is provided in this embodiment. The method further includes the following steps.

At step 61, the QoS required for the terminal to initiate the service is determined based on QoS configuration information for the service, in which the QoS configuration information includes at least one QoS parameter.

In an embodiment, the QoS parameter includes at least one of the followings: data transmission delay, a data packet loss rate, and a bandwidth for data transmission.

In an embodiment, the QoS configuration information is QoS configuration information pre-stored in the terminal, in which the QoS configuration information is different for different services;

or, the QoS configuration information is QoS configuration information input for the service detected when the terminal has a service initiation demand;

or, the QoS configuration information is historical QoS configuration information for the service.

In an embodiment, the QoS configuration information can be stored in a storage area of the terminal in advance. When a service is to be initiated, the terminal can obtain the QoS configuration information corresponding to the service from the storage are according to a service type of the service that is to be initiated, and determine the QoS configured for the service based on the QoS configuration information. The QoS configuration information can be threshold range information of the QoS parameter.

In an embodiment, when the terminal is to initiate a service, the terminal may detect the QoS configuration information input for the service by the user, and determines the QoS configured for the service based on the input QoS configuration information. The QoS configuration information can be the threshold range information for the QoS parameter.

In an embodiment, when the terminal is to initiate a service, it may determine QoS configuration information configured for the service based on QoS configuration information used by the terminal for historically initiating the service. In this way, there is no need to reconfigure the QoS configuration information for the terminal. Historically initiating the service can be initiating the service in a preset time period in the past.

In an embodiment, historically initiating the service can be initiating the service in a network that contains a satellite network or in a network that does not contain a satellite network. For example, if a delay requirement for initiating a service in the network that does not contain a satellite network is "a" seconds, a delay requirement for initiating the service in a network that contains a satellite is also "a" seconds.

In an embodiment, the network side includes: a transmission network, in which the transmission network includes: a satellite network.

In an embodiment, the network side includes:

an access network;

a transmission network, in which the transmission network includes: a satellite network; and a core network, in which the transmission network is connected between the access network and the core network.

The QoS provided by the network side includes: QoS indicated by a 5G Qos Identifier (5QI) of the satellite network.

In an embodiment, the QoS parameter includes at least one of the followings: data transmission delay, a data packet loss rate, and a bandwidth for data transmission.

In an embodiment, different 5QIs indicates different QoS.

Figure 7:
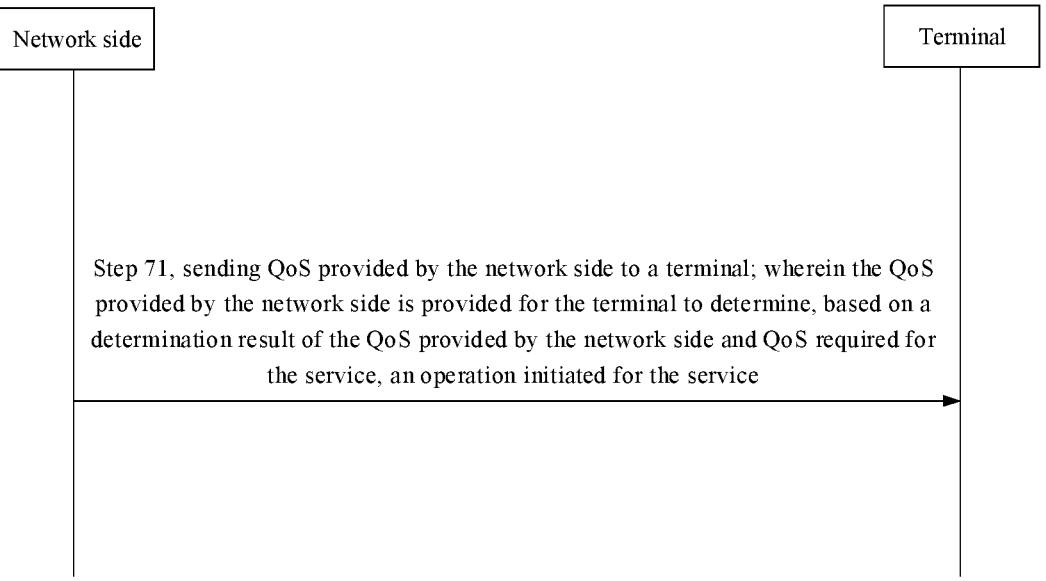
FIG. 7 is a flow chart of a process for initiating a service, performed by a network side, according to an embodiment.

As shown in FIG. 7, a method for initiating a service, performed by a network side, is provided in this embodiment. The method includes the following steps.

At step 71, QoS provided by the network side is sent to a terminal.

The QoS provided by the network side is provided for the terminal to determine based on a determination result of the QoS provided by the network side and QoS required for the service, an operation initiated for the service.

In some embodiments, the terminal may be, but is not limited to, a cell phone, a wearable device, a vehicle terminal, a RSU, a smart home terminal, an industrial sensing device and/or a medical device.

In an embodiment, the network side includes: a transmission network, in which the transmission network includes: a satellite network.

In an embodiment, the network side includes:

an access network;

a transmission network, in which the transmission network includes: a satellite network; and a core network, in which the transmission network is connected between the access network and the core network.

The access network at least includes: an access device that can be accessed by the terminal, such as a base station.

The transmission network is connected with the access network and the core network, and is used for data interaction between the access network and the core network.

The core network is a network that is far away from the terminal and provides data transmission for the terminal. The core network includes various core network elements, such as NEF, AMF, and SMF. Certainly, these are only examples of network elements of the core network.

The satellite network can be a network that uses satellites for data transmission. A communication link of the satellite network is a transmission link between the access network and the core network.

In an embodiment, the terminal may access the network through a base station in the access network. The network may be a NTN.

In some embodiments, the base station may be of various types, such as, a base station for the 3G mobile communication network, a base station for the 4G mobile communication network, a base station for the 5G mobile communication network, or other eNBs.

In some embodiments, the base station may be set up on a high altitude platform or on a satellite.

In an embodiment, the QoS may include a plurality of QoS parameters.

In an embodiment, the QoS parameters include at least one of the following parameters: data transmission delay, a data packet loss rate, and a bandwidth for data transmission.

In an embodiment, the QoS is determined based on the plurality of QoS parameters.

In an embodiment, each service is configured with a corresponding QoS, and the QoS includes different QoS parameter requirements. The QoS parameter requirement is used to indicate a QoS parameter of the QoS required to initiate the service.

In an embodiment, the QoS parameter requirement includes a requirement for at least one of the following parameters: data transmission delay, a data packet loss rate, and a bandwidth for data transmission. The QoS parameter requirement may be a threshold range of one or more kinds of the above parameters. For example, the data transmission delay is greater than A and less than B and/or the data packet loss rate is greater than C and less than D.

In an embodiment, when the QoS provided by the network side can satisfy the QoS configured for the service, the service can be initiated normally.

In an embodiment, when all the QoS parameters provided by the network side satisfy the QoS parameter requirements, the QoS provided by the network side satisfies the QoS configured for the service. When at least one QoS parameter in the multiple QoS parameters provided by the network side does not satisfy the QoS parameter requirements, the QoS provided by the network side does not satisfy the QoS configured for the service.

In an embodiment, the QoS required for initiating different services can be different.

In an embodiment, information of a QoS parameter requirement corresponding to each service can be stored in a storage space of the terminal in advance. When a service is to be initiated, the terminal can obtain the information of the QoS parameter requirement corresponding to the service from the storage space according to a service type of the service that is to be initiated, and can determine the QoS required for initiating the service according to the information of the QoS parameter requirement. The information of the QoS parameter requirement can be information about a threshold range of the QoS parameter.

In an embodiment, when the terminal is to initiate a service, QoS configured for the service may be determined based on QoS parameter requirements used by the terminal to initiate the service within a historical time period. In this way, there is no need to reconfigure the QoS parameter requirements for the terminal. Initiating the service within the historical time period can be initiating the service in a preset time period in the past.

In an embodiment, initiating the service within the historical time period can be initiating the service in a network that contains a satellite network within the historical time period or initiating the service in a network that does not contain a satellite network within the historical time period.

In an embodiment, if a delay requirement for initiating a service in a network that does not contain a satellite network during the historical time period is "a" seconds, a delay requirement for initiating a service in a network that contains a satellite network this time is also "a" seconds.

In an embodiment, the QoS that the network is capable to provide is determined based on a transmission network type used to initiate the current service. For example, when the transmission network type used to initiate the current service is a first transmission network type, the QoS provided by the network is determined to be a first QoS. When the transmission network type used to initiate the current service is a second transmission network type, the QoS provided by the network is determined to be a second QoS. A network of the first transmission network type is a network whose transmission network contains a satellite network. A network of the second transmission network type is a network whose transmission network does not contain a satellite network. The first QoS is different from the second QoS. It may be that a QoS parameter value contained in the first QoS is different from a QoS parameter value contained in the second QoS. For example, if the QoS parameter is the transmission delay, the transmission delay included in the first QoS is greater than the delay included in the second QoS. In this way, the QoS provided by the network side can be adjusted in time to adapt to the transmission network type used to initiate the current service.

In an embodiment, the network side provides different QoS at different time periods.

In an embodiment, when a channel transmission quality of channel transmission on the network side is greater than a channel transmission quality threshold, the QoS provided by the network side is greater than the QoS threshold. When the channel transmission quality of channel transmission on the network side is less than the channel transmission quality threshold, the QoS provided by the network side is less than the QoS threshold. In this way, the QoS provided by the network side can be adjusted in time to adapt to the channel transmission quality.

In an embodiment, when the number of services connected to the network side is greater than a quantity threshold, the QoS provided by the network side is less than the QoS threshold. When the number of services connected to the network side is less than the quantity threshold, the QoS provided by the network side is greater than the QoS threshold. In this way, the QoS provided by the network side can be adjusted in time to adapt to the number of services connected to the network side.

In an embodiment, when the transmission network on the network side contains a satellite network, the QoS provided by the network side is less than the QoS threshold. When the transmission network on the network side does not contain a satellite network, the QoS provided by the network side is greater than the QoS threshold.

In an embodiment, the network side periodically sends the QoS provided by the network side to the terminal.

In an embodiment, a sending period for the network side to send the QoS provided by the network side to the terminal can be determined according to a frequency at which the terminal initiates services.

In an embodiment, when the frequency at which the terminal initiates services is greater than a frequency threshold, the sending period for sending the QoS provided by the network side can be configured to be less than a period threshold. When the frequency at which the terminal initiates services is less than the frequency threshold, the sending period for sending the QoS provided by the network side can be configured to be greater than the period threshold. In this way, the sending period for sending the QoS provided by the network side can be adjusted adaptively according to the frequency at which the terminal initiates services, thereby saving system resources.

In an embodiment, when the terminal has a demand to initiate a service, the operation initiated for the service is determined based on the determination result of the QoS provided by the network side and the QoS required for the service determined by the terminal.

In an embodiment, in response to an application of the service being initiated, it is determined that the terminal has a demand to initiate the service.

In an embodiment, in response to establishing a RRC connection between the terminal and the base station, it is determined that the terminal has a demand to initiate the service.

In an embodiment, the determination result of the QoS provided by the network side and the QoS required for the service determined by the terminal includes the QoS provided by the network side satisfying the QoS required by the terminal to initiate the service, or the QoS provided by the network side not satisfying the QoS required by the terminal to initiate the service.

In an embodiment, the terminal may compare a value of the QoS provided by the network side with a value of the QoS required for the service, to obtain the determination result.

In an embodiment, the value of the QoS may be a weighted sum of QoS parameters determined based on preset weights. For example, QoS may include QoS parameters, i.e., transmission delay x and data packet loss rate y, and a preset weight coefficient for the transmission delay is a, and a preset weight coefficient for the data packet loss rate is b, the value of the QoS is z and $z=(ax+by)$.

In an embodiment, when the value of the QoS provided by the network side is greater than the value of QoS required for the service, it is determined that the QoS provided by the network side satisfies the QoS required for the terminal to initiate the service. When the value of the QoS provided by the network side is less than the value of the QoS required for the service, it is determined that the QoS provided by the network side does not satisfy the QoS required for the terminal to initiate the service.

In an embodiment, the QoS parameters for the QoS required for initiating the service are indicated by a QoS parameter threshold range. The terminal may compare the QoS parameters included in the QoS provided by the network side with corresponding QoS parameter threshold included in the QoS required for the service respectively, to obtain the comparison results.

In an embodiment, when each QoS parameter included in the QoS provided by the network side is within the corresponding QoS parameter threshold range included in the QoS required for the service, it is determined that the QoS provided by the network side satisfies the QoS required by the terminal to initiate a service. When the QoS provided by the network side contains at least one QoS parameter that is not within the corresponding QoS parameter threshold range included in the QoS required for the service, it is determined that the QoS provided by the network side does not satisfy the QoS required by the terminal to initiate the service.

In an embodiment, when the QoS provided by the network side satisfies the QoS required by the terminal to initiate the service, it is determined that the service is initiated. When the QoS provided by the network side does not satisfy the QoS required for the terminal to initiate the service, it is determined that the service is not initiated.

Figure 8:
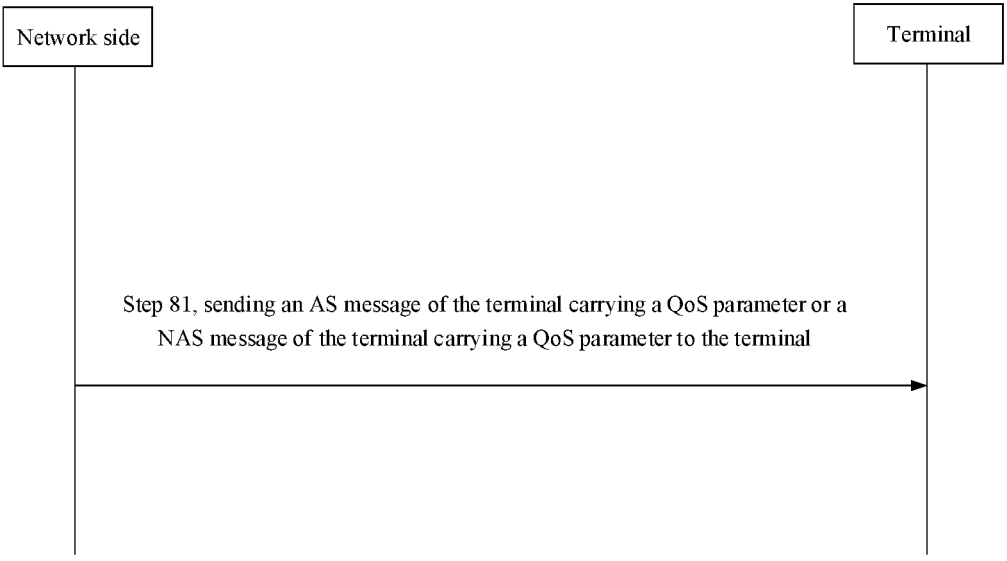
FIG. 8 is a flow chart of a process for initiating a service according to an embodiment.

As shown in FIG. 8, a method for initiating a service is provided in this embodiment. The step 71 of sending the QoS provided by the network side to the terminal, includes the following steps.

At step 81, an AS message of the terminal carrying a QoS parameter or a NAS message of the terminal carrying a QoS parameter is sent to the terminal.

In an embodiment, the NAS message includes: messages of two sub-layers: a CM sub-layer and a MM sub-layer.

In an embodiment, the AS message includes: messages of a RRC layer, a RLC layer and a MAC layer.

In an embodiment, the QoS parameter includes at least one of the followings: data transmission delay, a data packet loss rate, and a bandwidth for data transmission.

In an embodiment, the AS message and the NAS message carry one or more kinds of QoS parameters.

In an embodiment, the AS message and the NAS message may carry a threshold of one or more kinds of the above parameters. For example, the AS message carries information that the data transmission delay is greater than A and less than B.

In an embodiment, the carried QoS parameter may be a parameter indicated by a threshold range of the QoS parameter.

In an embodiment, the network side includes:

an access network;

a transmission network, in which the transmission network includes: a satellite network; and a core network, in which the transmission network is connected between the access network and the core network.

The QoS provided by the network side includes: QoS indicated by a 5QI of a satellite network.

In an embodiment, the QoS parameters include at least one of the followings: data transmission delay, data packet loss rate, and bandwidth for data transmission.

In an embodiment, different 5QI indicates different QoS.

Figure 9:
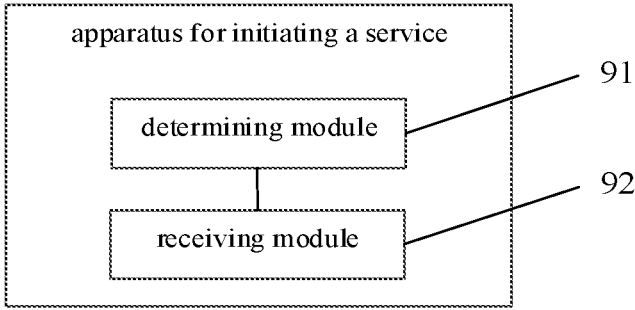
FIG. 9 is a block diagram of an apparatus for initiating a service according to an embodiment.

As shown in FIG. 9, an apparatus for initiating a service, implemented by a terminal, is provided in this embodiment. The apparatus includes: a determining module 91.

The determining module 91 is configured to determine an operation initiated for a service based on a determination result of QoS provided by a network side and QoS required for the service.

In an embodiment, the determining module 91 is further configured to:

in response to the QoS provided by the network side satisfying QoS required for the terminal to initiate the service, determine to initiate the service;

and/or, in response to the QoS provided by the network side not satisfying the QoS required for the terminal to initiate the service, determine not to initiate the service.

In an embodiment, the determining module 91 is further configured to:

determine the QoS provided by the network side based on the QoS parameter carried by an AS message received by the terminal or a NAS message received by the terminal.

In an embodiment, the apparatus further includes: a receiving module 92.

The receiving module 92 is configured to receive a reference signal sent by the network side.

The determining module 91 is further configured to: determine the QoS provided by the network side based on a detected parameter associated with the reference signal.

In an embodiment, the parameter associated with the reference signal includes at least one of: transmission delay of the reference signal and signal-receiving strength of the reference signal.

In an embodiment, the determining module 91 is further configured to:

determine, based on QoS configuration information for the service, the QoS required for the terminal to initiate the service, in which the QoS configuration information includes at least one QoS parameter.

In an embodiment, for the determining module 91, the QoS configuration information is: QoS configuration information pre-stored in the terminal, in which the QoS configuration information is different for different services;

or, the QoS configuration information is: QoS configuration information input for the service detected when the terminal has a service initiation demand;

or, the QoS configuration information is: historical QoS configuration information for the service.

In an embodiment, the network side includes:

a transmission network, in which the transmission network includes a satellite network; in which the QoS provided by the network side includes: QoS indicated by a 5QI of the satellite network.

Figure 10:
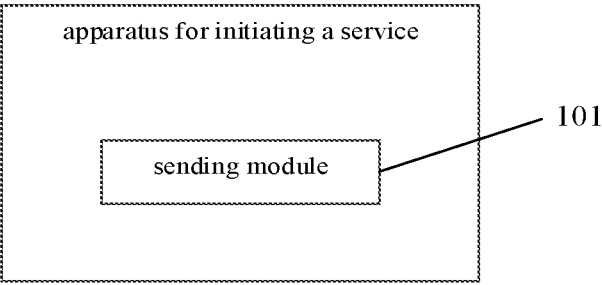
FIG. 10 is a block diagram of an apparatus for initiating a service according to an embodiment.

As shown in FIG. 10, an apparatus for initiating a service, implemented by a network side, is provided in this embodiment. The apparatus includes: a sending module 101.

The sending module 101 is configured to send QoS provided by the network side to a terminal.

The QoS provided by the network side is provided for the terminal to determine, based on a determination result of the QoS provided by the network side and QoS required for the service, an operation initiated for the service.

In an embodiment, the sending module 101 is further configured to:

send an AS message of the terminal carrying a QoS parameter or a NAS message of the terminal carrying a QoS parameter to the terminal.

In an embodiment, the network side includes:

a transmission network, in which the transmission network includes: a satellite network; in which the QoS provided by the network side includes: QoS indicated by a 5QI of the satellite network.

Regarding the apparatus in the above embodiments, the specific way in which each module performs its operation has been described in detail in the embodiments concerning the method, and will not be described in detail here.

The embodiments of the disclosure provide a communication device. The communication device includes:

a processor;

a memory for storing instructions executable by the processor.

The processor is configured to: implement a method applied to any embodiment of the disclosure when running the executable instructions.

The processor may include various types of storage mediums. The storage mediums are non-transitory computer storage mediums that can continue to remember information stored thereon after the communication device is powered off.

The processor may be connected to the memory via a bus or the like for reading executable programs stored on the memory.

The embodiments of the disclosure further provide a computer storage medium. The computer storage medium stores computer executable programs. When the executable programs are executed by a processor, the method of any embodiment of the disclosure is implemented.

Regarding the apparatus in the above embodiments, the specific way in which each module performs its operation has been described in detail in the embodiments concerning the method, and will not be described in detail here.

Figure 11:
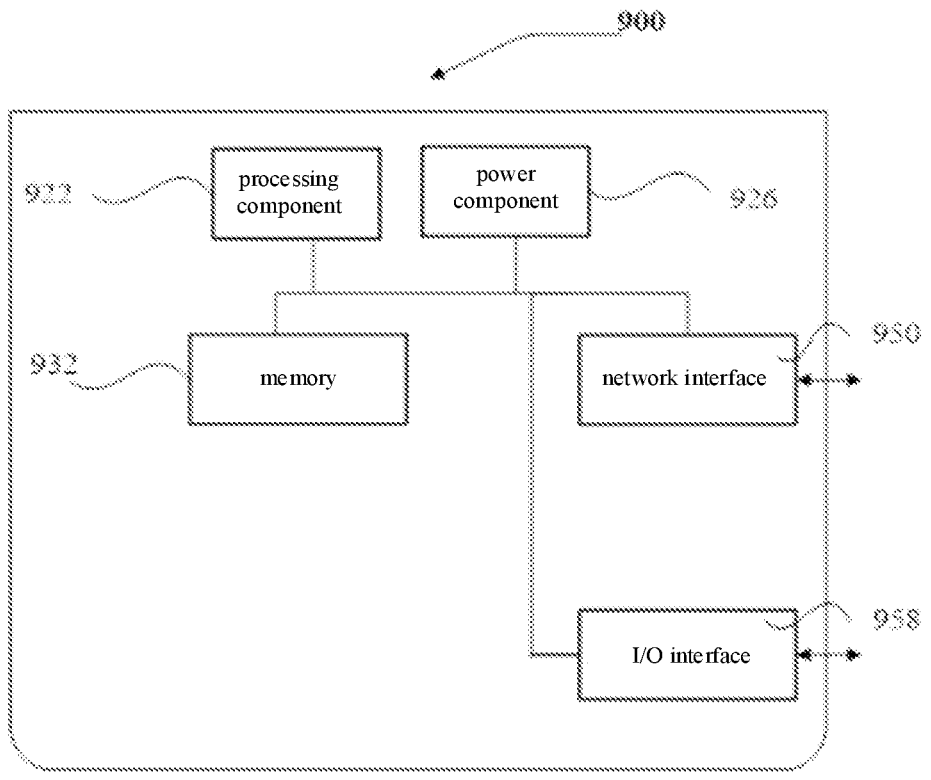
FIG. 11 is a block diagram of a base station according to an embodiment.

As shown in FIG. 11, the embodiment of the disclosure illustrates a structure of a base station. For example, a base station 900 may be provided as a network side device. As shown in FIG. 11, the base station 900 includes a processing component 922, which further includes one or more processors, and memory resources represented by a memory 932 for storing instructions that may be executed by the processing component 922, such as applications. The application programs stored in the memory 932 may include one or more modules each corresponding to a set of instructions. In addition, the processing component 922 is configured to execute the instructions to perform any of the methods described above, the method performed by the base station as previously described.

The base station 900 may also include a power component 926 configured to perform power management of the base station 900, a wired or wireless network interface 950 configured to connect the base station 900 to a network, and an Input/Output (I/O) interface 958. In wireless embodiments, network interface 950 may be an antenna. The base station 900 may operate an operating system stored on the memory 932, such as Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles of the disclosure and including common knowledge or customary technical means in the art. It is intended that the specification and embodiments are considered as exemplary only, and a true scope and spirit of the disclosure are indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:
1. A method for initiating a service, performed by a terminal, comprising:
receiving a reference signal sent by a network side;
determining Quality of Service (QoS) provided by the network side based on a detected parameter associated with the reference signal and a transmission network type used for the service; wherein the transmission network type is a first transmission network type or a second transmission network type, a network of the first transmission network type is a first network whose transmission network contains a satellite network and a network of the second transmission network type is a second network whose transmission network does not contain a satellite network;
determining an operation initiated for a service based on a determination result of the QoS provided by the network side and QoS required for the service; and
determining, based on QoS configuration information for the service, the QoS required for the terminal to initiate the service,
wherein the QoS configuration information comprises a threshold range of at least one QoS parameter, and the QoS configuration information is historical QoS configuration information used by the terminal to initiate the service during a historical time period in the first or second network;

a sending period for the network side to send the QoS provided by the network side to the terminal is determined according to a frequency at which the terminal initiates the service.
2. The method of claim 1, wherein determining the operation initiated for the service based on the determination result of the QoS provided by the network side and the QoS required for the service, comprises at least one of:
determining to initiate the service in response to the QoS provided by the network side satisfying QoS required for the terminal to initiate the service;
or,
determining not to initiate the service in response to the QoS provided by the network side not satisfying the QoS required for the terminal to initiate the service.
3. The method of claim 1, further comprising:
determining the QoS provided by the network side based on a QoS parameter carried by an Access Stratum (AS) message received by the terminal or a Non Access Stratum (NAS) message received by the terminal.
4. The method of claim 1, wherein the detected parameter associated with the reference signal comprises at least one of: transmission delay of the reference signal and signal-receiving strength of the reference signal.
5. The method of claim 1, wherein the network side comprises:
a transmission network, wherein the transmission network comprises a satellite network;
wherein the QoS provided by the network side comprises:
QoS indicated by a 5th generation mobile communication QoS Identifier (5QI) of the satellite network.
6. A method for initiating a service, performed by a network side, comprising:
sending a reference signal to a terminal; wherein Quality of Service (QoS) provided by the network side is determined by the terminal based on a detected parameter associated with the reference signal and a transmission network type used for the service, the transmission network type is a first transmission network type or a second transmission network type, a network of the first transmission network type is a network whose transmission network contains a satellite network and a network of the second transmission network type is a network whose transmission network does not contain a satellite network, the QoS provided by the network side is provided for the terminal to determine, based on a determination result of the QoS provided by the network side and QoS required for the service, an operation initiated for the service,
wherein the QoS required for the service initiated by the terminal is determined based on QoS configuration information for the service,
the QoS configuration information comprises a threshold range of at least one QoS parameter, and the QoS configuration information is historical QoS configuration information used by the terminal to initiate the service during a historical time period in the first or second network;
a sending period for the network side to send the QoS provided by the network side to the terminal is determined according to a frequency at which the terminal initiates the service.
7. The method of claim 6, wherein sending the QoS provided by the network side to the terminal, comprises:
sending an AS message of the terminal carrying a QoS parameter or a NAS message of the terminal carrying a QoS parameter to the terminal.

8. The method of claim 6, wherein the network side comprises:

a transmission network, wherein the transmission network comprises: a satellite network;

wherein the QoS provided by the network side comprises: QoS indicated by a 5QI of the satellite network.

9. A communication device, comprising:

an antenna;

a memory; and a processor, connected to the antenna and the memory respectively, and configured to control sending and receiving of the antenna by executing computer-executable instructions stored on the memory, to implement the method for initiating a service of claim 6.

10. A communication device, comprising:

an antenna;

a memory; and a processor, connected to the antenna and the memory respectively, and configured to control sending and receiving of the antenna by executing computer-executable instructions stored on the memory, to implement a method for initiating a service, the method comprising:

receiving a reference signal sent by a network side;

determining Quality of Service (QoS) provided by the network side based on a detected parameter associated with the reference signal and a transmission network type used for the service; wherein the transmission network type is a first transmission network type or a second transmission network type, a network of the first transmission network type is a network whose transmission network contains a satellite network and a network of the second transmission network type is a network whose transmission network does not contain a satellite network;

determining an operation initiated for a service based on a determination result of the QoS provided by the network side and QoS required for the service; and determining, based on QoS configuration information for the service, the QoS required for the communication device to initiate the service, wherein the QoS configuration information comprises a threshold range of at least one QoS parameter, and the QoS configuration information is historical QoS configuration information used by the communication device to initiate the service during a historical time period in the first or second network;

a sending period for the network side to send the QoS provided by the network side to the terminal is determined according to a frequency at which the terminal initiates the service.

11. The communication device of claim 10, wherein determining the operation initiated for the service based on the determination result of the QoS provided by the network side and the QoS required for the service, comprises at least one of:

determining to initiate the service in response to the QoS provided by the network side satisfying QoS required for the communication device to initiate the service; or, determining not to initiate the service in response to the QoS provided by the network side not satisfying the QoS required for the communication device to initiate the service.

12. The communication device of claim 10, wherein the method further comprises:

determining the QoS provided by the network side based on a QoS parameter carried by an Access Stratum (AS) message received by the communication device or a Non Access Stratum (NAS) message received by the communication device.

13. The communication device of claim 10, wherein the parameter associated with the reference signal comprises at least one of: transmission delay of the reference signal and signal-receiving strength of the reference signal.

14. The communication device of claim 10, wherein the network side comprises:

a transmission network, wherein the transmission network comprises a satellite network;

wherein the QoS provided by the network side comprises: QoS indicated by a $5^{th}$ generation mobile communication QoS Identifier (5QI) of the satellite network.

\* \* \* \* \*